Oct. 13, 1970  J. A. HOGAN ETAL  3,534,335
CONTROL STATION FOR A PROCESS CONTROL SYSTEM
FOR COMPUTER OR MANUAL INPUT
Filed June 21, 1967  4 Sheets-Sheet 1
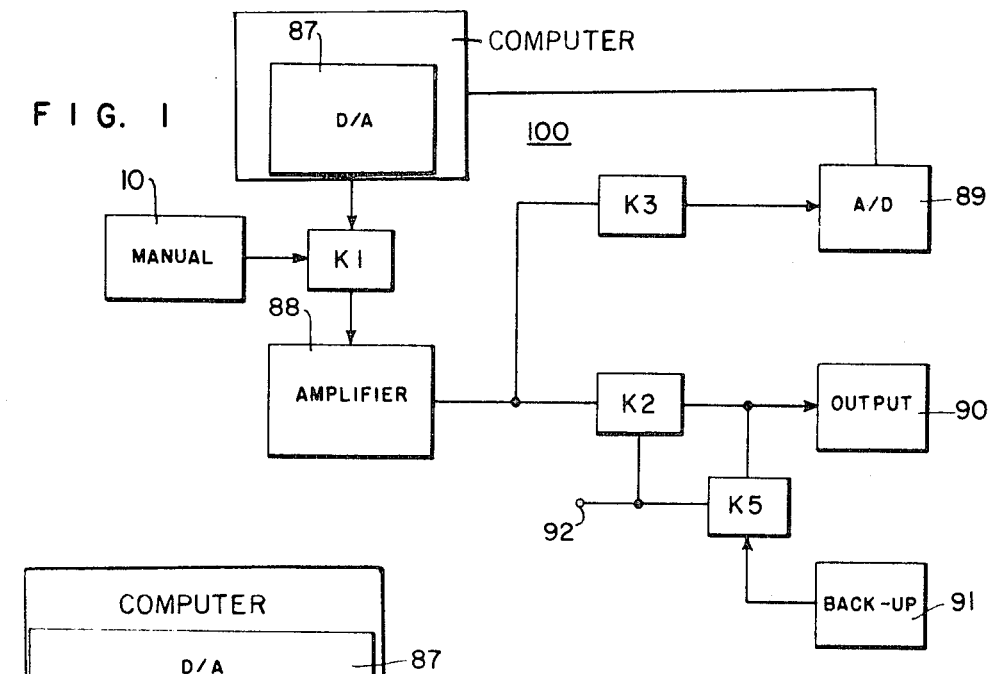
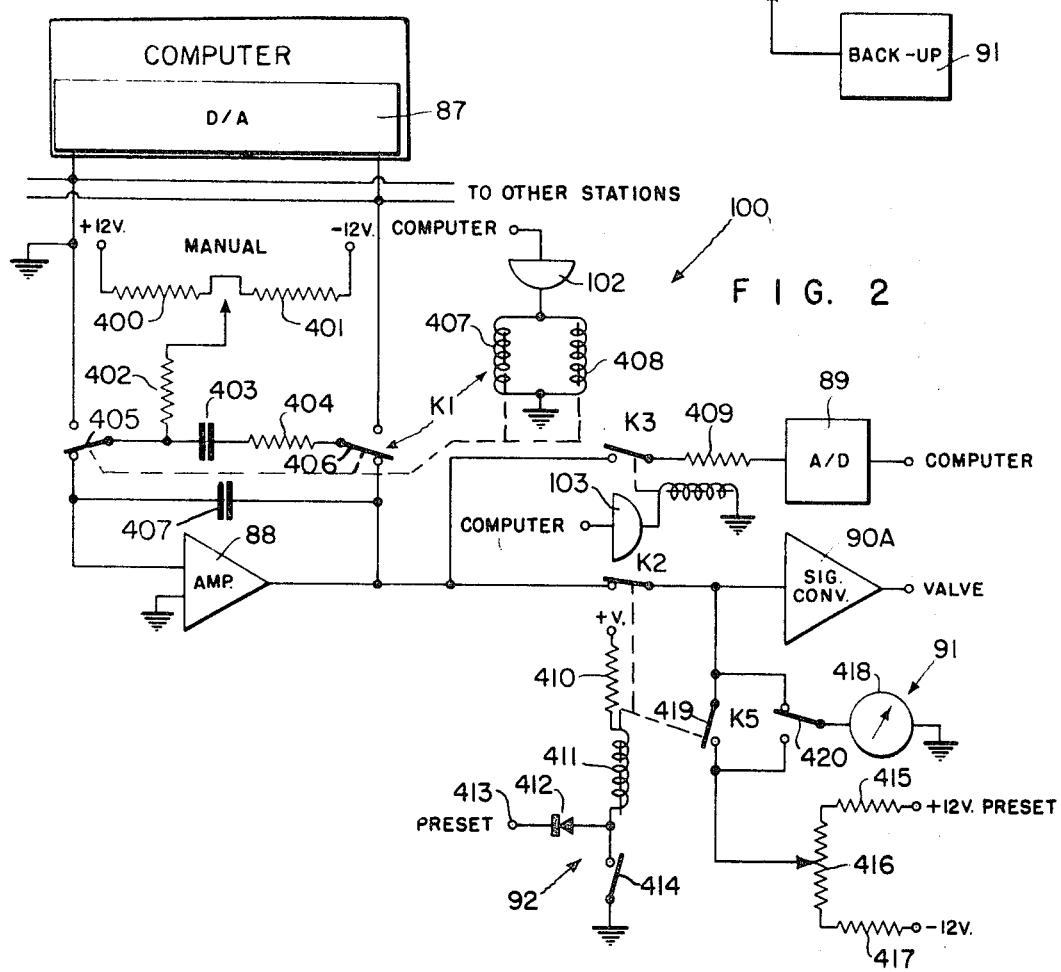
INVENTORS.
JAMES A. HOGAN
WILLIAM F. NEWBOLD
RICHARD J. SPADY
BY
G. Donald Weber Jr.
ATTORNEY.

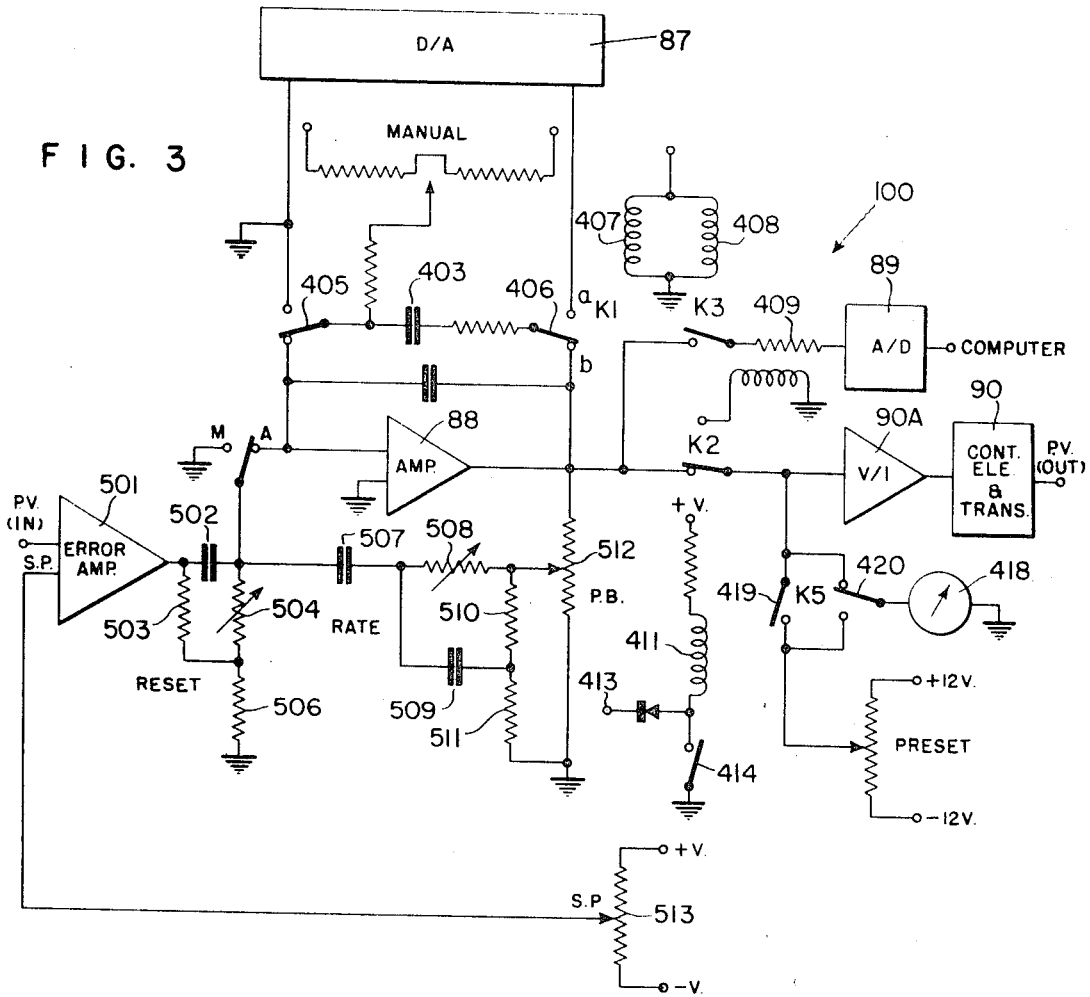

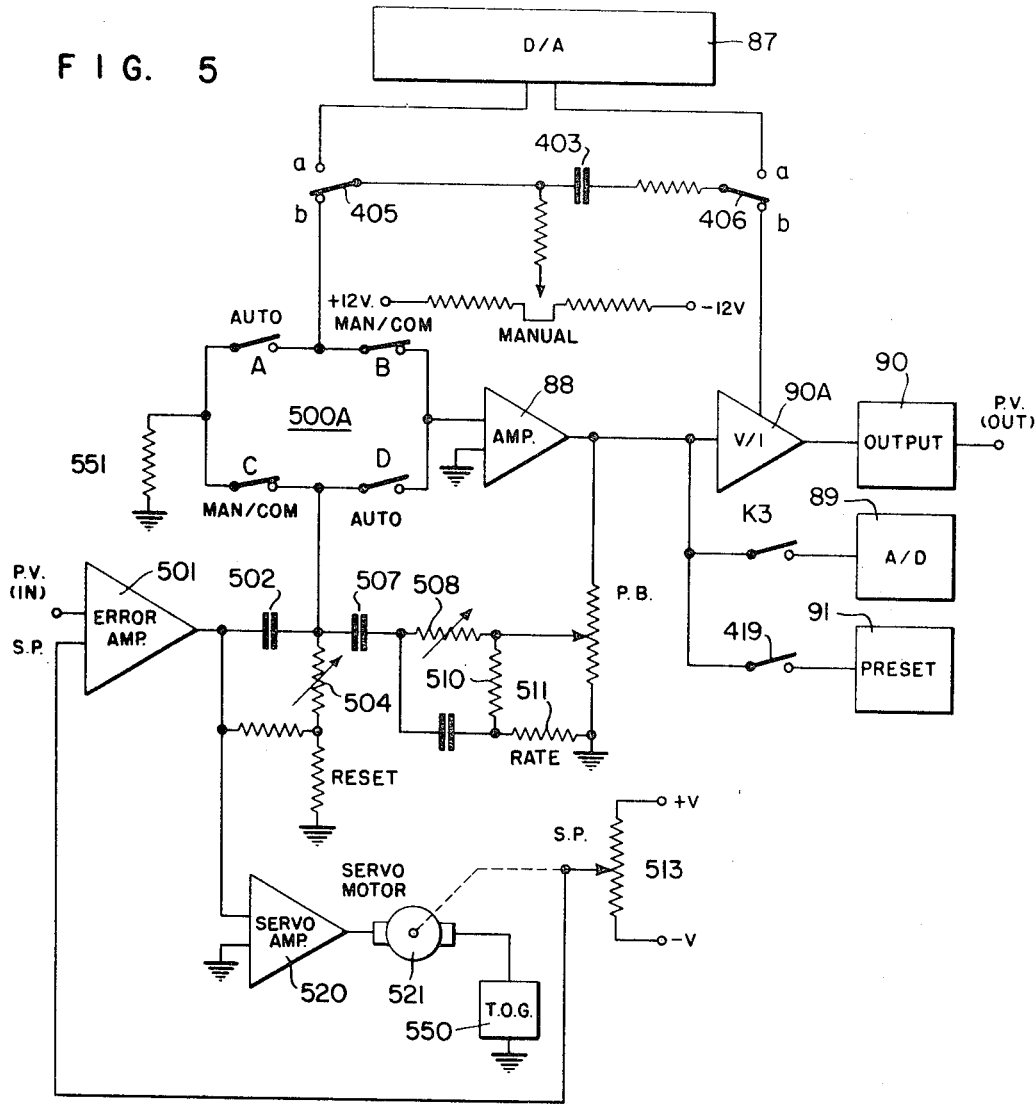

United States Patent Office 3,534,335
Patented Oct. 13, 1970

3,534,335
CONTROL STATION FOR A PROCESS CONTROL SYSTEM FOR COMPUTER OR MANUAL INPUT
James A. Hogan, Hatfield, William F. Newbold, Springfield Township, and Richard J. Spady, Feasterville, Pa., assignors to Honeywell Inc., Minneapolis, Minn., a corporation of Delaware
Filed June 21, 1967, Ser. No. 647,829
Int. Cl. G08c; G06f 15/46; H04q 9/00
U.S. Cl. 340—147                                    4 Claims

ABSTRACT OF THE DISCLOSURE

There is disclosed a control system for an industrial process. The system includes a control station which may be selectively operated by input signals from a digital computer, from a manual control element, or from an automatic analog control input. When under digital control, there is included a D/A converter with the output analog signal being applied through an amplifier to the input of a conventional control element such as a valve together with its associated valve actuator. When under manual or automatic control, an analog control signal is applied to the input of the same amplifier. An A/D converter is also disclosed which is selectively connected between the output of the amplifier and the input of the computer as a means of supplying back to the computer, data representative of the activity of the control station.

---

There are copending applications describing, specifically, designs or devices related to this invention. For example, two copending applications of J. Gormley, are of interest. One of these applications (04–3467–US) entitled Electrical Apparatus, bearing Ser. No. 589,447, was filed Oct. 25, 1966. Another application (04–3469–US) entitled Electrical Apparatus, bearing Ser. No. 582,109 was filed on Sept. 2, 1966, now abandoned, however, the subject matter thereof is disclosed and claimed in a divisional application thereof bearing Ser. No. 839,996, filed July 8, 1969. Also related is a copending application (3111) of W. F. Newbold, entitled Electrical Apparatus, bearing Ser. No. 433,875 and filed on Feb. 19, 1965, now Pat. No. 3,443,234. Furthermore, cross reference is made to the copending application (04–3449–US) entitled Direct Digital Control Interfacing Circuitry, bearing Ser. No. 651,586, filed on July 6, 1969, by J. Gormley et al, now Pat. No. 3,522,588. Two related copending design applications of interest are each entitled Face Panel for a Control Instrument. These applications which bear Ser. Nos. 3,468 and 3,420 respectively, filed on Aug. 11, 1966 by R. C. Miller. Each of the listed utility and design applications is assigned to the assignee of this application.

Control systems are known wherein a plurality of controlled elements are supervised or controlled by remote control units. Such systems are known as direct digital control (DDC), supervisory control, remote control or by similar nomenclature. However, in the past the problem has arisen that a direct communication between each of the controllers and the remote controlling unit has been required.

In the instant invention, control stations or control circuits are provided. These circuits or stations are utilized to control the remote unit which is to be controlled. The stations are adapted for manual, automatic or computer control operation. The circuits are designed to provide a failsafe condition in the event of loss of control by the controlling device such as the computer as well as to provide for substantially "bumpless" switching between the various modes of operation.

Thus, it is one object of this invention to provide a control system.

Another object of this invention is to provide a control system which is relatively simple in configuration.

Another object of this invention is to provide a control system which permits bumpless switching from several modes of operation.

These and other objects and advantages of this invention will become more readily apparent when the following description is read in conjunction with the attached drawings, in which:

FIG. 1 is a block diagram of the system of the subject invention;

FIG. 2 is a schematic diagram of one embodiment of the invention;

FIG. 3 is a modified version of the circuit shown in FIG. 2;

FIG. 5 is a modified version of the circuits shown in FIGS. 2–4.

Figure 4:
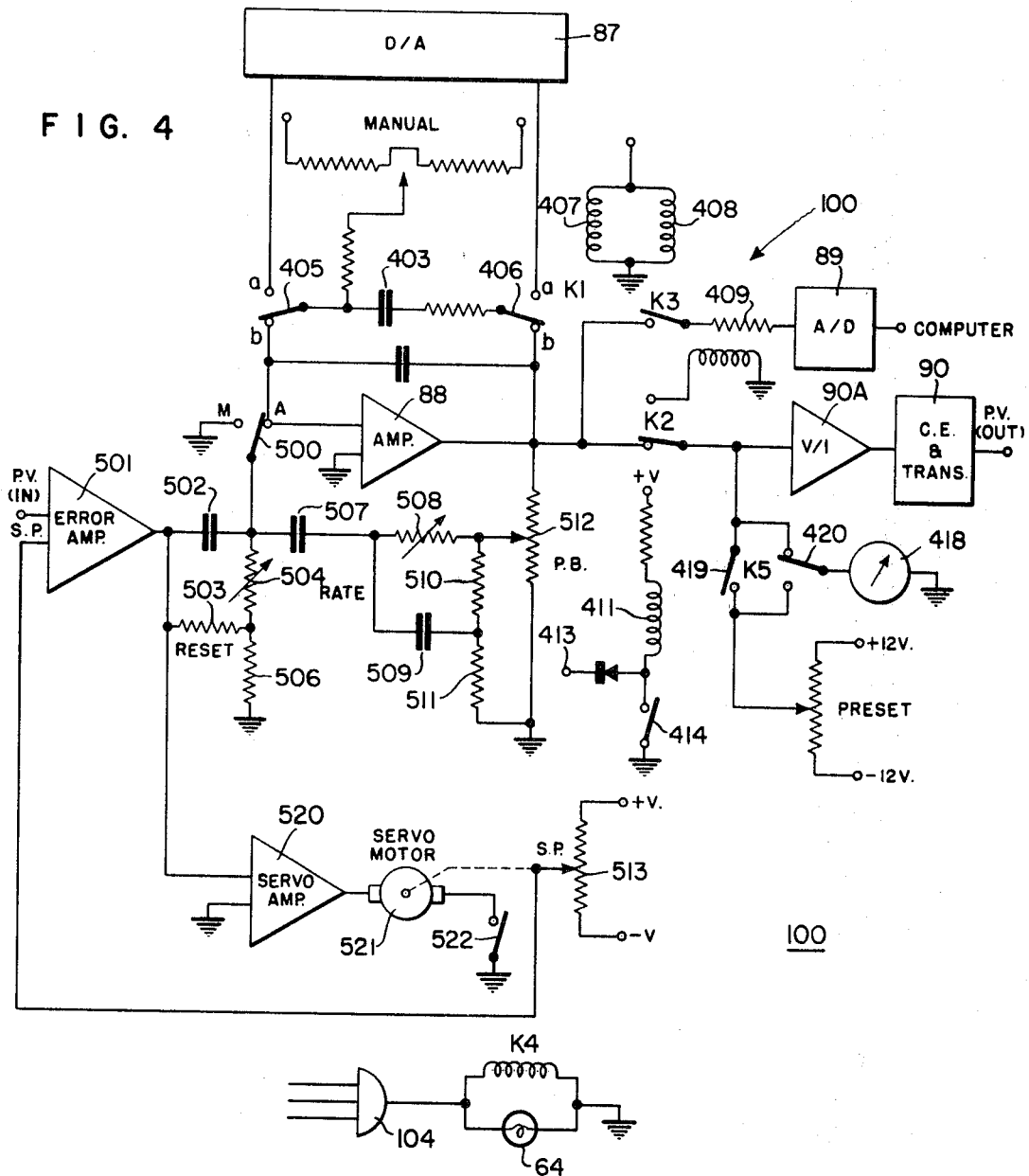
FIG. 4 is a modified version of the circuits shown in FIGS. 2 and 3.

Referring now to FIG. 1, there is shown a block diagram of a system which forms the basis of the subject invention. In this system, the overall circuit is designated as station 100. The station includes a digital to analog converter 87 which may be a part of a control computer (not shown). A manual control 10 is also provided. The manual control 10 and the D/A converter 87 are connected to a switch K1. The switch is further connected to amplifier 88. Switch K1 selectively connects the D/A converter 87 or the manual control 10 to the input of amplifier 88 as described in detail hereinafter. Various control means can be utilized to control the sample and hold amplifier circuit 100 or portions thereof.

A further switch K2 interconnects the output of amplifier 88 and the output device 90. Output device 90 may be any typical controlled element such as a valve or the like. Switch K2 is a normally closed switch or relay contacts such that as amplifier 88 produces an output signal, the signal supplied directly to the output device 90. A backup device 91 is connected to the output device 90 by means of switch K5. Backup device 91 may be any standard preset or fail-safe type of circuitry which is utilized to operate the output device 90 in a predetermined manner in the event of a failure in the amplifier operation as for example, in the event of computer down time.

Switch K5 is a normally open switch such that the backup device 91 is only selectively connected to output device 90. As is shown, switches K2 and K5 are interrelated and may be controlled by an external control means 92. An external control signal may be supplied by means of a manual type switch or by the computer circuit. The interrelationship between switches K2 and K5 is such that the application of a signal at terminal 92 causes switch K2 to become an open circuit while simultaneously causing K5 to become a closed circuit. In fact, switches K2 and K5 may represent normally open terminals respectively on a single switch element controlled by a single solenoid or the like. Thus, it is clear that a single control element such as a computer can control, through proper sequencing or the like, the interconnection between the D/A converter and the amplifier 88; the amplifier and the A/D converter 89; the amplifier 88 and the output device 90; and the backup circuitry and the output device 90 as well. It should be noted that A/D converter 89 may form a portion of the control computer. Thus, at selected intervals, switch K3 may be closed whereby the output of amplifier 88 is connected to the A/D converter for conversion thereby and insertion of the digital signal into the control computer.

Thus, in operation, either the D/A converter 87 or the manual device 10 supplies signals to amplifier 88 via switch K1. A suitable mode control device selects the appropriate setting of switch K1. Amplifier 88 operates upon the signals supplied thereto via switch K1 to produce an analog output signal. This analog output signal is supplied, typically, via switch K2 to the output device 90 to produce an operation thereby. At appropriate times, switch K3 may be selectively closed whereby the analog output signal of amplifier 88 is transferred to the A/D converter 89. The analog signal is converted into a digital signal and supplied to the computer for operation thereupon.

Upon presentation of a proper or suitable signal at terminal 92, switch K2 is opened and switch K5 is rendered conductive whereby backup device 91 supplies a signal to output device 90 which drives the output device to a suitable failsafe condition. For example, if the aforesaid control computer becomes inoperative or the like, it may be necessary and/or desirable to have the output device 90 assume a predetermined condition. The proper signal to produce the condition is supplied by backup device 91 via switch K5.

Referring now to FIG. 2, there is shown a schematic diagram of one embodiment of the sample and hold amplifier circuit 100. In FIG. 2, components which are similar to components shown in FIG. 1 bears similar reference numerals. Thus, the D/A converter 87 is connected through a switching means K1 to amplifier 88. As shown in FIG. 2 switching means K1 includes a pair of relays 405 and 406 each having contacts a and b. The relays which may actually be reed relays are each controlled by the associated coil 407 and 408. Coils 407 and 408 are shown as paired coils, although a single coil will suffice in many arrangements. The coils are controlled by update gate 102 which is connected to the computer in this diagrammatic showing.

As noted, a pair of relays are utilized. This pair of relays produces so-called form C switching. It is understood that a form A type switching can be used to interrupt the connections between the D/A converter 87 and the amplifier 88. The relays are connected such that the contacts a of each of the relays is connected to the D/A converter 87. Contact a of relay 405 is further connected to ground or other suitable reference potential. Contact b of switch 405 is connected to one input of amplifier 88. The other input of amplifier 88 is connected to ground or other suitable reference potential. Contact b of switch 406 is connected to the output of amplifier 88. The series combination of capacitor 403 and resistor 404 is connected between the armatures of relays 405 and 406. Capacitor 403 is normally termed the memory capacitor in this type of circuit. That is, in accordance with the conditions of coils 407 and 408, the armatures of relays 405 and 406 are selectively brought into engagement with the associated contacts a. This engagement places memory capacitor 403 across the D/A converter terminals whereby the signal produced by the D/A converter 87 is stored in capacitor 403.

Upon the deenergization, for example, of coils 407 and 408, the armatures of switches 405 and 406 are placed in engagement with the respective contacts b. This engagement connects capacitor 403 across amplifier 88 whereby the signal stored in capacitor 403 is now discharged through amplifier 88 to produce an output thereby. Capacitor 407 is shown connected in parallel with amplifier 88 and, effectively, in parallel with capacitor 403. Capacitor 407 is a temporary storage capacitor and may be utilized to control the operation of the amplifier 88 when all the relays 405 and 406 are in engagement with contacts a. Capacitor 407 prohibits amplifier 88 from producing erroneous information when in the "free-floating" state. However, capacitor 407 may be eliminated in many cases, especially inasmuch as the switching operation of switches 405 and 406 can be sufficiently rapid to avoid any drifting of the amplifier when the input is disconnected from capacitor 403.

The output of amplifier 88 is connected via normally closed switches K2 to the input of signal converting element 90A which is a portion of the output device. The output signal from signal converter 90A may be applied directly to a valve or similar controlled element. Signal converter 90A may be a V/I converter or similar type of apparatus.

The output of amplifier 88 is further connected to normally open switch K3. Switch K3 is connected, via resistor 409, to the A/D converter 89. The output of the A/D converter 89 may preferably be connected to the control computer. Switch K3 is controlled by an associated coil which is connected to and controlled by gate 103 which gate is connected to the control computer.

A switch K5 is connected to an input of the signal converter 90A. In the embodiment shown, switch means K5 includes a first switch 419 which is normally open and a single-pole, double-throw switch 420. The single-pole, double-throw switch has the pole thereof connected to a meter 418. A voltage divider network comprising resistor 415, 416 and 417 is connected between suitable potential sources for example +12 volts and −12 volts. The wiper arm of variable resistor 416 is connected to one contact of each of the switches 419 and 420. It is clear, that meter 418 is adapted to selectively indicate the magnitude of the signal supplied to the input of signal converter 90A or the signal supplied by the preset network (which comprises the voltage divider circuit) in accordance with the position of the armature of the single-pole, double-throw switch 420. Thus, with switch 419 open and switch 420 in the position shown, meter 418 reads the signal level of the signal applied to the input of signal converter 90A. When switch 420 is switched to the other positions, the potential at the wiper arm of variable resistor 416 is detected. This permits the Preset output of potentiometer 416 to be detected without disturbing the operation of the output device.

Switches K2 and 419 are controlled by solenoid 411. Solenoid coil 411 is connected in series with switch 414 and resistor 410 between suitable reference potentials such as +18 volts and ground. Diode 412 has the anode thereof connected to the common junction between coil 411 and switch 414. The cathode of diode 412 is connected to the Preset terminal 413 which maybe associated with the control computer. This circuit permits manual or computer control of the Preset circuit. For example, if switch 414 is open (as shown) and a low level signal is supplied to terminal 413, solenoid 411 is activated. On the contrary, if a high level signal is supplied at terminal 413 and switch 414 is closed, solenoid 411 is activated. If a high level signal is supplied at terminal 413 and switch 414 is simultaneously open, soelnoid 411 is deactivated. Through solenoid 411, control of the output valve may be switched from computer control to a Preset condition. For example, activation of solenoid 411 opens the normally-closed contacts of switch K2 and closes the normally-open contacts of switch 419. Thus, the signal applied at the wiper arm of variable resistor 416 is applied to the input of signal converter 90A via switch 419.

Typically, resistor 416 is set to a position whereby a suitable potential is supplied. The suitable potential, when supplied to the output device 90, will drive said device to a predetermined condition when the Preset signal is supplied to terminal 413 or at switch 414. For example, output device 90 may represent a valve which is driven to the closed (or open) position in emergency conditions. In other words, a predetermined, suitable failsafe condition is achieved. This failsafe condition may, in fact, produce a large change (or "bump") in the system operation and is the typical operation.

Referring now to FIG. 3, there is shown another embodiment of the sample and hold amplifier circuit 100. The circuit shown in FIG. 3 includes an analog controlled loop. In FIGS. 2 and 3, similar components bear similar reference numerals. One important feature which the circuit shown offers is the ability to supply an error signal. The error signal is supplied by error amplifier 501 to amplifier 88 via a computational network in accordance with the operation of switch 500 which is a singlepole, double-throw switch. Switch 500 can alternatively be connected to the M or A contact where the M (Manual) contact is connected to a suitable reference potential for example ground. The A (Automatic) contact is connected to an input of amplifier 88. Switches 500 and 405 are mutually associtaed switches. That is, when switch 500 is in the M position, switch 405 is engaged with the b contact thereof. The manual control network (described relative to FIG. 2) is utilized to control the input to amplifier 88 when in the manual configuration.

In the alternative, when switch 500 is connected to the A contact, switch 405 is connected to the a contact thereof. In this switch arrangement, the memory capacitor 403 is disconnected from the input of amplifier 88 and will not affect the amplifier. However, amplifier 88 has the input thereof connected via the aforesaid computational circuit to the error amplifier 501. As will be seen this circuit provides an analog control loop. The error amplifier 501 receives the PV signal as one input and the SP signal as another input. The PV, or process variable, signal is produced by the controlled element and transmitter 90 which is connected to the V/I or converting device 90A. Controlled element and transmitter 90 is one type of output device and produces a signal which is indicative of the condition of the controlled element.

The SP or set point signal is supplied by the manually adjustable set point circuit. The set point circuit includes a voltage divider network comprising suitable impedance means 513 connected between suitable potential sources +V and −V. Impedance means 513 may include a plurality of coarse adjustment resistors, as well as a find adjustment variable resistor. The wiper ar mof variable resistor 513 is connected to the SP input of amplifier 501. Thus, through a manual adjustment of the wiper arm of resistor 513, a set point or predetermined, satisfactory signal is supplied to error amplifier 501. This signal is designed to provide a proper control signal for the apparatus.

The PV (out) signal produced by controlled element and transmitter 90 is returned as the PV (in) signal at amplifier 501. As the process variable signal varies relative to the set point signal, an error signal is generated by amplifier 501. This error signal is supplied as an input to amplifier 88 via the computational network and switch 500. Amplifier 88 produces an output signal in accordance with the input signal supplied thereto. The output signal produced by amplifier 88 is supplied, via switch K2 and conversion device 90A, to the controlled element and transmitter 90 until the PV and the SP signals are substantially identical. Additionally, the output of amplifier 88 is applied across capacitor 403 which is returned to ground at terminal a. Thus capacitor 403 tracks the output of amplifier 88. Therefore, when switches 500 and 405 are returned to the M and b contacts respectively, capacitor 403 provides a signal which maintains amplifier 88 at its most recent output condition. This operation produces bumpless transfer from the Automatic to the Manual mode.

The signal supplied by the error amplifier 501 is supplied to the amplifier 88 through a computational network. The computational network comprises a coupling capacitor 502 which is connected between the output of amplifier 501 and the armature of switch 500. A series combination of resistors 503 and 506 are connected between the output of amplifier 501 and a suitable reference potential, for example group. Resistors 503 and 506 are related such that the operating characteristics of the circuit, at start-up, are enhanced. One end of variable resistor 504 is connected to the junction between resistors 503 and 506. The other end of resistor 504 is connected at the armature of switch 500. Resistor 504 is used to provide the adjustment for the Reset function. Capacitor 507, in conjunction with resistor 504 and the amplifier 88, produces an integrating operation wherein the error signal from amplifier 501 is "reset" and reduced. That is, the error signal from amplifier 501 is integrated by the circuit including the Reset network. This network drives the output signal until the output device produces a PV signal which is substantially identical to the SP signal whereby the error signal is eliminated.

Also connected to the Reset network are the Rate and Proportional Band networks. The Proportional Band (P.B.) network includes variable resistor 512 which is connected between the output of amplifier 88 and a suitable reference potential, for example ground. Also, capacitors 502 and 507, associated with resistor 512, provide the necessary reciprocal gain function (i.e. proportional band). Typically, an error signal $E_e$ is supplied by amplifier 501 to amplifier 88 via capacitor 502 which is part of the computational network. An output signal E is generated by amplifier 88 and applied, inter alia, across resistor 512. A proportional value of this output signal is applied via the variable tap of resistor 512 across capacitor 507. Ultimately, the voltages across capacitors 502 and 507 achieve a proportional relationship such that the input signal supplied to amplifier 88 is a virtual ground.

The Rate network includes variable resistor 508 and capacitor 509 connected substantially in parallel. This network produces a delay in the feedback path of amplifier 88. The delay function produces an overall differentiating effect relative to amplifier 501 and the error signal produced thereby. Resistors 510 and 511 are connected between the variable tap of resistor 512 and a suitable reference potential, for example ground. These resistors provide a voltage dividing network to produce a useful potential at the Rate network. Essentially, the delay function produced by the Rate network in the feedback path operates to critically damp the system whereby anticipatory control is utilized to compensate for system inertia. That is, as the error signal approaches zero, for example, the Rate network effects an apparent change in the Proportional Band operation. Thus, overshoot or ringing is substantially avoided.

In one embodiment, the Rate network is effectively disabled during manual and computer control. This disabling is effected by means of a short-circuiting device (not shown) such that switchover to automatic control is performed without Rate action and the delay action of the Rate network is avoided.

Referring now to FIG. 4, there is shown another embodiment of the sample and hold amplifier circuit 100. This circuit is similar to the circuit shown in FIGS. 2 and 3. However, the circuit shown in FIG. 4, includes an additional degree of sophistication. In this circuit, means are supplied whereby the set point signal and the process variable signal control a servo loop. The servo loop provides a set point tracking of the process variable as a function of the error signal produced by error amplifier 501.

In FIG. 4, similar reference numerals relate to similar components of FIGS. 2 and 3. For example, the D/A converter 87 is selectively connected to the memory capacitor 403 by means of switches 405 and 406. These switches are controlled by coils 407 and 408, respectively. Capacitor 403 is further connected across amplifier 88 by means of the same switches. The output of amplifier 88 is connected via switch K3 or switch K5 to the A/D converter 89 or to the output device 90 as the case may be. The Preset circuitry is identical to that described supra.

The input to amplifier 88 is supplied via switch 500 and may be either manual, automatic or computer. In the automatic condition, the input signal is controlled by the Reset, Rate and Proportional Band networks as discussed supra. In addition, the setpoint (SP) signal is supplied by variable resistor 513. However, the output of error amplifier 501 is connected to one input of servo amplifier 520. The servo amplifier supplies a signal to servo motor 521. Servo motor 521 is mechanically coupled to the wiper arm of variable resistor 513 and causes relative motion thereof. Thus, if an error signal is detected between the PV and SP signals, error amplifier produces a signal which is supplied to servo amplifier 520. The output signal from amplifier 520 is supplied to servo motor 521 when switch 522 is closed. The resultant motion in servo motor 521 drives the wiper arm of variable resistor 513 until the PV and SP signals are similar and an error signal is not produced.

In one embodiment, switch 522 is closed by means of gate 104 which is connected to the coil K4 and lamp 64. A more detailed description of suitable circuitry of gate 104 is described in Pat. No. 3,522,588. With the application of the proper signal to gate 104, an energizing signal is supplied to coil K4 whereby switch 522 is closed. In the absence of a signal produced by gate 104, switch 522 remains open and the set point tracking apparatus is not operable. The signals supplied to gate 104 may be provided by a control computer or similar equipment.

Thus, the circuit shown in FIG. 4 provides the standard amplifier having sample and hold characteristics as described supra. This circuit has manual control at the input, a Preset or failsafe backup at the output and an error tracking apparatus which causes the error signal between the set point variable and the process variable to be as small as possible. With these additional circuits, an emergency condition such as computer failure, is not catastrophic. That is, the analog controller will take control and produce the control operation with the Set Point signal set at the most recent value of the P.V. signal.

Referring now to FIG. 5, there is shown another embodiment of the sample and hold amplifier station circuit 100. The circuit shown in FIG. 8 is partially schematic and partially block diagram. As in the circuits previously described, D/A converter 87 is utilized to provide input information. The D/A converter 87 is connected to the contacts a of switches 405 and 406. The armatures of switches 405 and 406 are connected to the storage capacitor 403. A manual backup control is also connected to the storage capacitor 403. The input information is supplied to operational amplifier 88. However, the input connections to amplifier 88 are modified. The switching circuit 500A comprises four contacts or terminals designated as A, B, C and D. The contacts may, in fact, comprise separate switches or they may be the contacts of four-way contact switch such as a relay or the like. It is noted that the switches operate in pairs; namely, contacts A and D and contacts B and C are associated in concurrently operated pairs. In the preferred embodiment, contacts B and C are normally closed and represent the manual computer connection. The contacts A and D are normally open contacts and represent the automatic operational mode.

The switch circuit 500A is connected between an input to amplifier 88 and a suitable reference potential, for example ground, via resistor 551. The switch circuit 500A is connected such that the contacts A, B, C and D form a bridge-type network. Thus, with contacts B and C normally closed, the Reset circuit, as well as the servo backup and the like, are connected to ground via resistor 551. Likewise, contact b of switch 405 is connected to the input of amplifier 88 via normally closed switch B of switch circuit 500A. This connection arrangement permits the amplifier 88 to receive inputs which are supplied by the D/A converter 87 or form the manual control.

In the opposite condition, namely with contacts A and D closed and contacts B and C open, terminal b of switch 405 is connected to ground via resistor 551 and contacts A. Likewise, the input of amplifier 88 is connected to the output of error amplifier 501 via closed contacts D and Reset circuit. Thus, in the automatic mode of control, input signals are supplied to amplifier from the error amplifier 501.

In the circuit embodiment shown in FIG. 7, the output of amplifier 88 is connected to the Proportional Band circuitry as well as the input to the power amplifier and conversion circuit 90A. Additionally, the output of amplifier 88 is selectively connected to the A/D converter 89. Preset network 91 is selectively connected to the input of power amplifier 90A. It will be noted, that in this circuit the return to contact b of switch 406 is not made directly from output of amplifier 88. Rather, in this circuit the return is made via an output from the signal converter or power amplifier 90A. This circuit congfiuration provides advantages, for example, improved accuracy due to availability of compensation for temperature changes and the like.

Also, the servo network comprising servo amplifier 520 and servo motor 521 are connected in series with a time-out gate (TOG) 550. This time-out gate may be used in lieu of gate 104. It should be noted, that this time-out gate may be utilized in any of the circuits previously shown. A detailed description of time-out gate 550 is found in the copending application entitled Electrical Apparatus, bearing Ser. No. 582,109, filed on Sept. 26, 1966 by J. Gormley and assigned to a common assignee. This circuit, as described in detail in the copending application, permits the servo loop to remain "online" so long as regularly supplied signals are provided by the control computer. If the computer goes "off-line" or is, for some reason, no longer in control of the operation, the time-out gate 550 completes its cycle and the servo network is removed from control. Furthermore, the time out gate alters the position of switch network 500A such the circuit is placed on automatic control. That is, the input to amplifier 88 is supplied by error amplifier 501.

There has thus been described a system for providing interfacing circuitry between a large number of remote units and a centralized control element. This system permits unique control functions to be utilized. Several embodiments of circuits or networks are described. The system and subsystems which form the embodiments are illustrative only. The specific circuits shown and described are not meant to be limitative of the invention. Rather, as suggested both within the instant description and the cited copending applications, modifications to the circuits may be readily suggested to those skilled in the art. Such modifications, if within the scope of the inventive concepts herein described, are meant to be included.

The embodiments of the invention in which an exclusive property or privilege is claimed are defined as follows:

1. A control system comprising:
    amplifier means,
    input means including at least a first and a second signal means,
    first switch means connected between said input means and the input of said amplifier means whereby said input means supplies signals to said amplifier means selectively from said first or second signal means,
    output means,
    second switch means connected between said output means and the output of said amplifier means whereby said output means is selectively connected to said amplifier means,
    and coupling means connected between the output of said amplifier means and said input means whereby the output of said amplifier means is selectively coupled to said first signal means of said input means in order to provide information thereto for affecting the information supplied from said first signal means of said input means to said amplifier means.

2. The control system recited in claim 1 wherein said amplifier means comprises operational amplifier means, storage means adapted to receive signals from said input means and apply signals to said amplifier means in accordance with the condition of said first switch means, and wherein said first signal means of said input means includes digital computing means and said second signal means includes manually variable source means which can be separately controlled.

3. The control system recited in claim 1 including further signal supplying means, and third switching means connected between said further signal supplying means and said output means whereby the signal supplied by said further signal supplying means selectively drives said output means to a preset condition upon failure of signals from said amplifier means.

4. The control system recited in claim 2 characterized by the addition of an analog controller circuit including error amplifier means, means for supplying an input signal representative of the condition of a controller process to the input of said error amplifier means, reference signal means, said reference signal means being connected for supplying a reference signal representative of a desired condition of said controlled process to said error amplifier means, said error amplifier means providing an output signal representative of the difference between said last mentioned input signal and said reference signal; said controller circuit further including rate circuit means, reset circuit means and proportional band means connected thereto; and selectively operable switch means for selectively connecting the output of said analog controller circuit to said amplifier means.

References Cited

UNITED STATES PATENTS

| | | | |
|---|---|---|---|
| 2,937,369 | 5/1960 | Newbold et al. | 340—177 |
| 3,117,310 | 1/1964 | Roper et al. | 340—187 |
| 3,219,936 | 11/1965 | Eksten et al. | |
| 3,246,250 | 4/1966 | Nazareth | 330—10 |
| 3,290,563 | 12/1966 | Hyer et al. | 330—51 XR |
| 3,356,994 | 12/1967 | Elbling. | |
| 3,443,235 | 5/1969 | Newbold | 330—9 |

OTHER REFERENCES

Automatic Control, "The Digital Computer as a Control Element," Geoffrey Post, pp. 48–52, October 1958.

DONALD J. YUSKO, Primary Examiner

U.S. Cl. X.R.

340—187